United States Patent

Julie

[15] 3,665,322

[45] May 23, 1972

[54] PRECISION CONVERTER/AMPLIFIER UTILIZING A COMPARATOR NETWORK AND A PAIR OF INTERNAL SIGNAL SOURCES

[72] Inventor: Loebe Julie, New York, N.Y.

[73] Assignee: Julie Research Laboratories, Inc., New York, N.Y.

[22] Filed: June 17, 1970

[21] Appl. No.: 47,144

Related U.S. Application Data

[63] Continuation of Ser. No. 627,846, Apr. 3, 1967, abandoned.

[52] U.S. Cl. ..............................328/3, 324/106, 235/193.5, 328/144

[51] Int. Cl. ..............................G06g 7/20

[58] Field of Search....................328/3; 324/106; 235/193.5

[56] References Cited

UNITED STATES PATENTS

| | | | |
|---|---|---|---|
| 3,435,319 | 3/1969 | Richman | 321/1.5 |
| 2,565,922 | 8/1951 | Howard | 324/106 |
| 3,210,663 | 10/1965 | Moseley et al. | 324/106 |

OTHER PUBLICATIONS

" Measuring RMS Voltages Automatically" by Peter Richman Electronic Products, September 1966 pp. 129, 130

*Primary Examiner*—Donald D. Forrer
*Assistant Examiner*—Harold A. Dixon
*Attorney*—Meyer A. Gross

[57] ABSTRACT

A precision converter or power amplifier of electrical signals comprised of a comparator bridge having a pair of isolated circuit branches matched for a particular voltage level. An input signal *a* is applied to one branch, a second signal *b* after amplification or attenuation by a factor *k* is applied to the other branch, and a third signal *c* is coupled to both branches so as to add either in linear or in rms fashion to each of the signals *a* and *b* respectively. The amplitudes of the two signals *b* and *c* are adjusted so that, for any value of input signal *a*, the matched operating level is restored across both branches, whereupon $ka = b$ and the desired signal conversion between input and output is obtained. In an rms converter embodiment, each of the circuit branches contains a power-sensitive element (e.g., a thermistor or thermocouple), the third signal *c* has a waveform which is non-coherent with the waveforms of both *a* and *b*, and the respective signals add in rms fashion so that $ka$ rms $= b$ rms.

17 Claims, 4 Drawing Figures

PRECISION CONVERTER/AMPLIFIER UTILIZING A COMPARATOR NETWORK AND A PAIR OF INTERNAL SIGNAL SOURCES

This application is a continuation of application Ser. No. 627,846 filed Apr. 3, 1967, now abandoned.

BACKGROUND OF THE INVENTION

The present invention relates to instrumentation for the precision conversion or power amplification of electrical signals utilizing a bridge comparison circuit of matched amplitude or power sensitive elements in an arrangement which maintains said elements at the same, constant operating point in the balance condition of the bridge irrespective of the amplitude of the signal to be converted. In a principal embodiment the invention is used as an rms converter to transform a first signal waveform to an rms-equivalent second signal waveform, for example an AC-to-DC conversion or vice-versa, with the amplitude transformation being made either on a one-to-one basis or, through attenuation or multiplication by a constant factor, on a basis such that the output signal amplitude bears a fixed proportional relationship to that of the input signal.

Comparison circuits comprised of a matched pair of power-sensitive elements, such as thermocouples, thermistors, etc., in a bridge arrangement have been used in the past for rms conversion of electrical signals. In such prior art circuits, which are employed in commercial so-called "true" rms meters, the input signal which is to be converted (for example an AC signal) is fed to one branch of the bridge, a separate signal source of different waveform e.g., a battery source of DC potential) is connected to the other branch, and the output or converted signal is derived through the adjustment of the magnitude of the latter signal to achieve bridge balance. However, the operating point for the bridge balance condition is not constant, but instead varies dependent upon the amplitude of the input signal. Since it is extremely difficult, if not practically impossible from an economic standpoint, to obtain a pair of power-sensitive elements whose characteristics are so identical that they will remain matched over a substantial range of operating points, the accuracy of such conventional bridge comparator circuits is necessarily limited when used for precision rms conversion purposes.

In one recently announced rms converter device, the Weston-Rotek Model PR 840 RMS/DC converter described in an article by P. Richman appearing in the September 1966 issue of Electronic Products Magazine, pp. 129–30, an attempt is made to avoid the limitations of conventional rms converter designs by employing thermo-elements having plural heater windings. Through a feedback arrangement, both AC and DC signals are supplied to associated heaters of each thermoelement in the bridge, with the asserted result that the comparator circuit of the Weston device is maintained at a constant operating point, independent of the input voltage. This new design is said to provide converter accuracy on the order of 0.1 percent, as compared with the 1 percent accuracy of conventional true rms converters. However, one factor materially affecting the inherent accuracy of the Weston converter design is the requirement that the two separate heater windings, a pair being provided for each of the two thermoelement branches of the comparator bridge, be identically matched; that is, the AC and DC heater windings of each thermoelement should ideally have the same transfer characteristic in their respective effect on the operating point of the element. (In other words, a 1 percent change in the current flow through the AC heater winding of a thermoelement should produce the same resultant change in the output of the element as a corresponding 1 percent change in the current flow through its DC winding). In effect therefore, the Weston device avoids the need for one kind of match between the thermoelements in the comparator bridge by substituting another, different kind of match requirement, with the result that the converter's accuracy is now dependent upon the degree of identicality between the heater-winding transfer characteristics of the thermoelements used in the bridge circuit.

SUMMARY OF THE INVENTION

The present invention overcomes the technical deficiencies of the prior art conversion devices such as the rms converter devices referred to above by providing a novel design approach which avoids the necessity of using a comparison network comprised of pairs of closely-matched components of identical characteristics in order to achieve high accuracy signal conversion. The approach is based on a unique bridge arrangement which, through the adjustment of various circuit parameters, is always restored in the balance condition to the same, singular operating point, irrespective of the amplitude of the input signal to be converted. In the several embodiments of the invention this bridge balance is effected by the adjustment of the potential level of a third signal source (separate from the converter input and output sources) which is inserted into the bridge solely for this purpose.

In one exemplary embodiment of the invention in the form of an rms converter, a pair of power-sensitive resistor elements (thermistors) are inserted in corresponding arms of two Wheatstone resistor bridges. The resistor arms of the respective bridges are initially adjusted so that at a particular applied voltage E both bridges independently will be in balance with a null (no signal) present across their respective output arms. Thereafter, the input signal (that is, the signal to be converted) is applied across one of the bridges, and the output signal source (that is, the signal whose voltage level is to be rms-matched to the inut) is applied across the other bridge.

Next a third signal source, of a waveform noncoherent with either the input or output signals, is supplied to both of one bridges so that the voltage applied across the respective bridges is a composite potential formed by the rms addition of the third signal to the corresponding input or output signal as the case may be. The amplitude of this third signal is then adjusted so that the composite rms potential applied across the "imput" bridge, that is, the bridge to which the input signal is supplied, is exactly equal to the voltage E (this condition being satisfied by a zero-signal output from the bridge as indicated by its associated nulling meter). Following this balancing of the input bridge, the amplitude of the output signal, which together with the third signal is applied to the other or "output" bridge of the circuit, is adjusted so that this bridge too is restored to the balance or null signal condition.

With the above mentioned circuit operational conditions satisfied, then, since in each case the same third signal is added to form the composite potential E appearing across each bridge, the resultant adjusted output signal must be equal rms-wise to the input signal, and the desired signal conversion is effected. If the input signal should thereafter change to a new value, then the respective amplitudes of the third and output signal sources would then be readjusted to return the two bridges back again to the balance condition in the manner just described.

Since the two bridges in the rms converter circuit are balanced always at the same applied potential E, there is no requirement, as in prior art devices, that the two power-sensitive elements be of matched electrical characteristics. Thus, highly accurate true rms signal conversion is obtained by this circuit arrangement since any differences in electrical characteristics between the thermistor elements or between other components of the respective bridges do not affect the precision of the conversion.

In a practical modification of the above-described embodiment, feedback control means are provided in the circuit to automatically make the required amplitude adjustments of the respective third signal and output signal sources for setting and maintaining the two bridges at the balance point, thereby eliminating the need for manual adjustments during operation of the converter.

Other rms converter embodiments described herein include, in contradistinction to the double-bridge arrangement summarized above, single-bridge circuit arrangements formed, in one case by two thermocouples, and in another case by two indirectly heated thermistor elements. Also, provision is made in these embodiments for suitable attenuator or amplifier means so that the output signal of the converter may be adjusted to bear a predetermined proportional relationship to the input signal. Accordingly a signal can be precisely amplified by a predetermined factor, $k$, and appear at the output of the circuit as a potential source which is electrically isolated from the input signal source.

In addition to their use in an rms converter for transforming a signal of one waveform or frequency to an rms-equivalent signal of a different waveform or frequency, the teachings of the present invention are also applicable to the construction of a novel type of converter wherein the input and output signals are coherent both with each other and also with the third signal source so that the respective signals add in linear rather than rms fashion. For example, all three signal sources may be DC signals levels or, alternatively, all may be AC signals of the same frequency and phase. In such situations, where the output signal may be of the same waveform as the input signal, the transformation provided in the present apparatus by the use of the comparison network and third signal source serves as a means for electrically de-coupling or isolating the input signal from the output — an advantageous feature in many electrical applications requiring minimal signal loading.

It is therefore a principal objective of the present invention to provide a novel and improved method and apparatus for the automatic and precision conversion of electrical signals.

It is another objective of the present invention to provide a precision rms converter for transforming electrical signals of one waveform into rms proportional signal source which is both inherently more accurate and operable over a far wider range of signal amplitudes than conventional rms converters heretofore known.

And it is another object of the present invention to provide an isolation converter or amplifier apparatus for providing an output signal which is coherent in waveform and proportional in amplitude to an applied input signal, but is electrically decoupled therefrom.

It is a further objective of the present invention to provide a precision converter whose circuitry does not require the use of any components of matched electrical characteristics.

It is a specific object of the present invention to provide a new and improved type of automatic true AC-to-DC rms converter which is both more accurate and more economical than prior art devices.

It is a principal feature of the present invention that its converter circuit operates in a manner whereby the comparison elements thereof are balanced always at the same, singular potential level irrespective of the amplitude of the input signal, thus eliminating any conversion errors due to individual differences in electrical characteristics between corresponding elements of the circuit.

The foregoing and other objectives, features and advantages of the invention will be more readily understood upon consideration of the following detailed description of the invention, taken in conjunction with the accompanying drawings.

DESCRIPTION OF THE PREFERRED EMBODIMENTS

Figure 1:
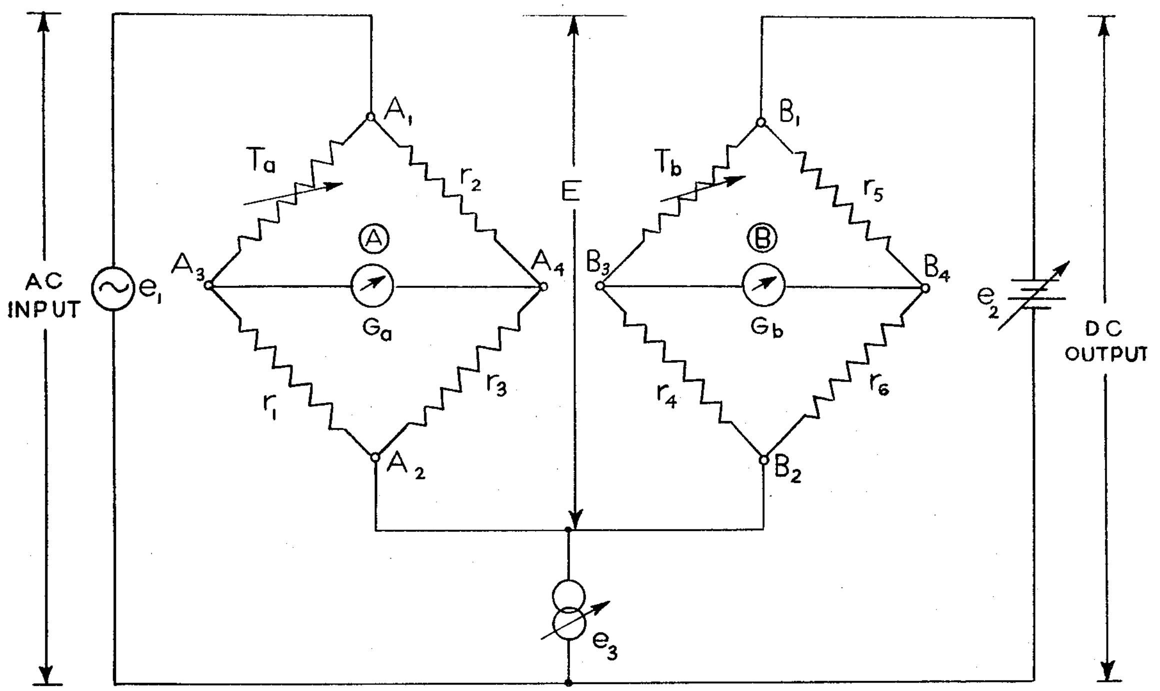
FIG. 1 is a schematic diagram of a simplified manually operated circuit for rms AC-to-DC signal conversion formed of a double bridge arrangement of thermistor elements and embodying the principles of the present invention.

Referring now to FIG. 1, there is shown a circuit diagram of an exemplary but simplified embodiment AC-to-DC converter apparatus for carrying out the rms signal conversion process of the present invention. Two Wheatstone bridges A and B are used to form the comparison network of the circuit. Bridge A is comprised of four arms, i.e., a power-sensitive thermistor element $T_a$ in the upper left-hand arm and conventional resistors $r_1,r_2,r_3$ in the other three arms of the bridge. As shown in the diagram the applied potential E is placed across the upper and lower terminals, $A_1$ and $A_2$, and a nulling meter $G_a$ is connected across the other two terminals, $A_3$ and $A_4$, of the Wheatstone bridge A. In corresponding manner the second bridge B is similarly formed of a thermistor arm $T_b$ and three resistor arms $r_4$, $r_5$, $r_6$.

By reason of the presence of a thermistor element in one arm of each bridge, then, for each bridge, there is one and only one applied voltage E which will result in a zero signal or balance across the middle terminals of the bridge. This is so, as will be readily understood by those skilled in the art, because the thermistor, being a power-sensitive element, will present a resistance to current flow through the left-hand branch of the bridge which varies as a function of the applied potential, whereas the other, right-hand branch will have a constant ohmic value independent of the applied voltage level. Therefore there will be a unique value of the applied bridge potential E which will produce identical voltage drops at the mid-terminal points of each bridge so as to result in a zero potential difference and a corresponding null indication on the meter.

In addition to the foregoing there is another important characteristic possessed by the two bridges A and B by reason of the presence of the respective thermistor arms $T_a$ and $T_b$. Since a thermistor is a true power-sensitive element, its resulting resistance is dependent upon the rms value of the voltage applied across its terminals.

Considering again the circuit of FIG. 1, the two bridges A and B are initially adjusted, by the selection of suitable values for the various resistors $r_1 \ldots r_6$, so that both are in balance for the same identical applied voltage E. (One of the distinctive features of the present invention is that it is not essential that the respective thermistors $T_a$ and $T_b$ be of matched electrical characteristics, although as a matter of convenience it is usually preferable to employ thermistor pairs of somewhat similar characteristics). This initial operational step of matching the two bridge networks A and B for the same potential E can be carried out either before the entire circuit is assembled or in the assembled circuit of FIG. 1 by the temporary connection of a voltage source of amplitude E (all voltage potentials specified herein are rms values) across the two bridges and the concomitant adjustment of the respective resistor arms $r_1 \ldots r_6$ (some of which are made variable for this purpose) until nulls are indicated on both meters $G_a$ and $G_b$.

With the two bridges A and B matched, the subsequent operational steps are performed with the circuit apparatus shown in FIG. 1. The AC signal source $e_1$ represents an input signal which is to be converted on an rms-basis by the apparatus into a corresponding DC output signal supplied by the adjustable battery source $e_2$. A third signal source $e_3$ is provided which might typically be a high-frequency oscillator in the apparatus having a different frequency than that of the AC source $e_1$. As shown in the Figure, the circuit is arranged so that the input signal $e_1$ is applied to bridge A, the battery potential $e_2$ is applied to bridge B, and the third signal $e_3$ is in a common series path and thus applied to both bridges A and B. Thus, the resultant voltage applied across the terminals $A_1$, $A_2$ of bridge A is the rms composite of $e_1$ and $e_3$, expressed in mathematical terms as $$eA_1A_2 = \sqrt{e_1^2 + e_3^2} \quad (1)$$

and the corresponding rms composite voltage applied across bridge B is $$eB_1B_2 = \sqrt{e_2^2 + e_3^2} \quad (2)$$

The amplitude of the high-frequency signal $e_3$ is now manually adjusted so that bridge A becomes balanced, as indicated by a zero signal on the nulling meter $G_a$. Next, the battery potential $e_2$ is manually adjusted to similarly restore bridge B to balance. Having balanced both bridges for their common, matched potential $E$ at which they each produce a null output across their respective meters, then the following equality relationship is established $$eA_1A_2 = \sqrt{e_1^2 + e_3^2} = E = eB_1B_2 = \sqrt{e_2^2 + e_3^2} \quad (3)$$

whereupon $$e_1^2 + e_3^2 = e_2^2 + e_3^2 \quad (4)$$

and therefore $$e_1^2 = e_2^2, \quad (5)$$

meaning that the rms value of the AC input signal $e_1$ equals the rms value of the DC output provided by the battery source $e_2$, and the desired signal conversion has been obtained.

If the input signal $e_1$ should now change to a new value, then it would of course be necessary to rebalance the two bridges $A_1$ and $A_2$ by readjustment of sources $e_2$ and $e_3$; however, when such mutual balance is restored, both bridges would again have the same singular potential $E$ applied across their respective branches. Consequently, regardless of the range of variation in the input signal $e_1$, the two bridges A and B are always restored to a mutual balance condition of operation which is invariant and independent of differences in electrical characteristics existing between the two thermistor arms $T_a$ and $T_b$ or between respective resistor arms of the two bridges.

It will be evident that, in order for the disclosed circuit of FIG. 1 to satisfactorily convert an input signal $e_1$ of greater value than $E$, it is necessary for suitable matched attenuator means (not shown) to be included on both the input and output sides of the circuit. Such matched attenuation will enable the input and output signals $e_1$ and $e_2$ to be scaled down to values which can then be rms added, respectively, to the third signal $e_3$ to attain the desired composite potential $E$ for application to the associated bridges.

Figure 1A:
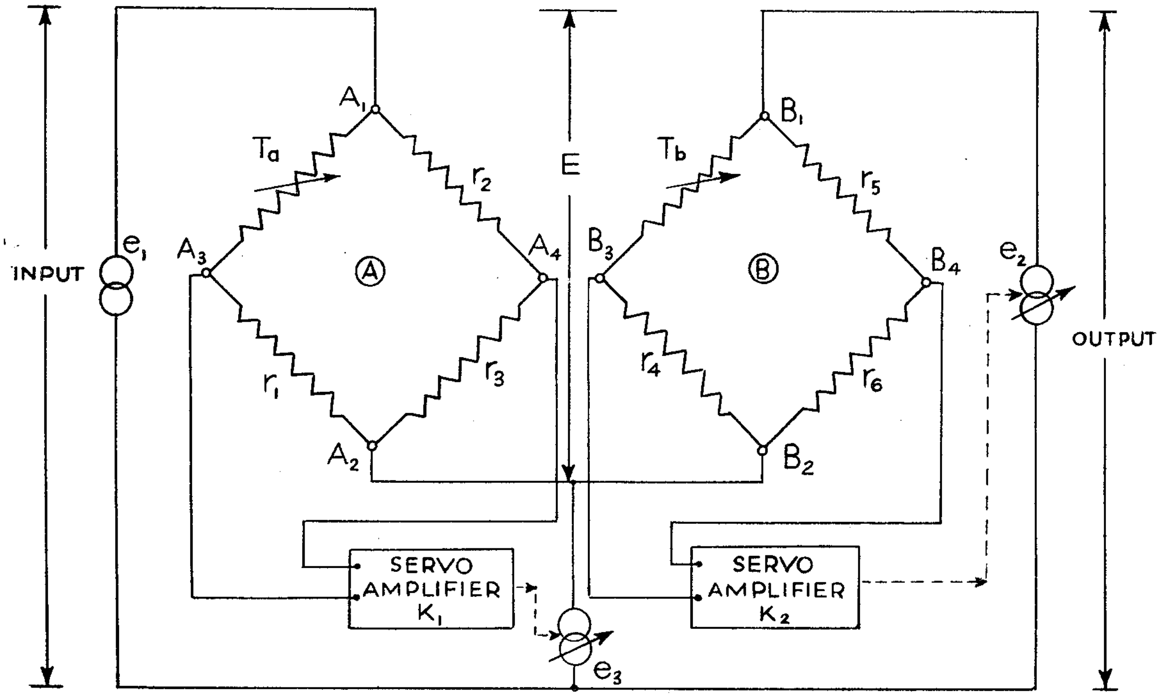
FIG. 1*a* is a schematic diagram of a modified embodiment, generally similar to FIG. 1, for the conversion of a signal of a first waveform to an rms-equivalent signal of a second waveform and including feedback control means for automatic operation.

FIG. 1a is a schematic diagram of the circuit of FIG. 1 modified to include feedback control means for automatically adjusting the signal voltages $e_2$ and $e_3$ to restore the bridges A and B to balance. In this modified embodiment the respective sources for the input and output signals $e_1$ and $e_2$ are represented with more generality to indicate that the circuit can broadly be used to convert a signal $e_1$ of a first waveform into an rms-equivalent signal $e_2$ of a second waveform.

The only material limitation on the operation of the circuit of Fig. 1a is that the third signal $e_3$, which is applied in common to both bridges, be non-coherent in waveform with both $e_1$ and $e_2$. This limitation is necessary in order to ensure that the two signals applied in each case to the respective bridges A and B will not add in a linear fashion, but instead will be combined in an rms manner. For the requisite noncoherency to be present there must be no signal component in common between $e_1$ and $e_3$ or $e_2$ and $e_3$. Thus, for example, if there should be a DC component present in $e_1$, there can be none present in $e_3$, although it would be permissible under such circumstances for a DC component to exist in the waveform of $e_2$. Similarly, for satisfactory operation, $e_3$ must not contain any AC frequency component in common with either $e_1$ or $e_3$. As a practical matter the signal source $e_3$ would typically be a high-frequency oscillator with its frequency selected to be well above the expected ranges for $e_1$ and $e_2$, or alternatively a swept oscillator or wide-band noise source.

As shown in the modified circuit embodiment of FIG. 1a, an error or feedback control signal is derived across the output terminals $A_3$, $A_4$ of bridge A and applied as an input to a servo amplifier $K_1$ of conventional design. (The nulling meters $G_a$ and $G_b$ are dispensed with in this modified circuit because they are superfluous in view of the automatic control means). The output of the servo $K_1$ serves via a mechanical (or alternatively, electrical) coupling to vary the amplitude level of the third signal source $e_3$ in accordance with the error signal. The operation of the control circuit is such that the servo adjusts the level of the signal $e_3$ in a direction so as to minimize the input signal to the servo, thus in effect automatically balancing the bridge A by the setting of the voltage level of $e_3$ for any value of the input signal $e_1$.

In similar manner a second control circuit provided by the servo amplifier $K_2$ acts on an error signal derived across the output terminals $B_3$,$B_4$ of bridge B to vary the amplitude of the output signal source $e_2$ and thereby also achieve balance of the latter bridge. Consequently, both bridges A and B will be automatically maintained at balance and at their matched operating point (that is, the point at which an rms voltage potential of level $E$ is applied across both bridges) so that the requisite signal conversion is effected by the circuit without need for manual intervention.

As a variation of the circuit embodiment of FIG. 1*a*, it is possible, by the use of a suitable frequency-selective or bandpass filter in the feedback loop controlling the output of bridge A, to eliminate the need for a separate oscillator to provide the third signal source $e_3$. Thus, in this variation, the servo amplifier $K_1$, in combination with the bridge A and the bandpass filter, would constitute a stable amplitude feedback oscillator generating as an output an electrical signal $e_3$ of a different frequency than either $e_1$ or $e_2$. Furthermore, by reason of the servo loop, $e_3$ would automatically assume the proper potential level for maintaining bridge A in balance. This output signal $e_3$ of the amplifier $K_1$ would also serve as the previously described third signal input to bridge B. Accordingly, with this variation, the need for a separate oscillator element for the $e_3$ signal is eliminated.

Figure 2:
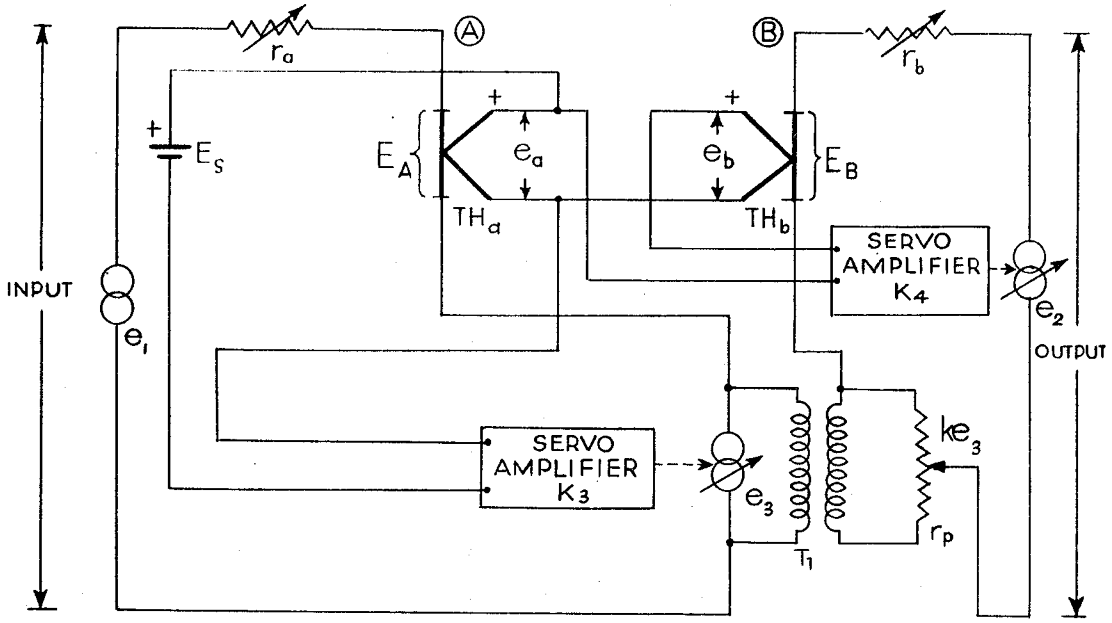
FIG. 2 is a schematic diagram of an alternative circuit embodiment employing a single bridge arrangement formed of differential thermocouple elements and including means for varying the proportional amplitude relationship between the input and output signals.

FIG. 2 is an alternative embodiment of a circuit for effecting signal conversion according to the present invention which employs a bridge arrangement of differential thermocouple elements, together with automatic control means for maintaining the bridge in balance and with means for varying the proportional amplitude relationship between the input and output signals.

In this alternative embodiment the thermocouples $TH_a$ and $TH_b$ serve as the comparison network replacing the dual Wheatstone bridge arrangement of the previous embodiment. The heater winding of thermocouple $TH_a$ is connected in the input or A branch of the circuit so as to have impressed across its terminals the composite potential formed by the addition of signals $e_1$ and $e_3$. The primary of a transformer $T_1$ is connected across the third signal source $e_3$, and its secondary winding is connected to a potentiometer $r_p$. The variable arm of the potentiometer enables a factor $k$ to be introduced so that a signal $ke_3$ is added to the output signal source $e_2$ to form the composite signal $e_2 + ke_3$ which is applied across the heater winding of thermocouple $TH_b$ in the output branch B of the comparison network.

By the use of respective balancing trimmers $r_a$, $r_b$, the two thermocouples $TH_a$ and $TH_b$ are adjusted so that their respective DC outputs $e_a$ and $e_b$ are equal when voltages of respective predetermined potentials are applied across their heater windings. In other words,, $TH_a$ and $TH_b$ are matched at a single operating point to provide the same level of output signal when a predetermined voltage $E_a$, applied to the heater winding in circuit branch A, and a second predetermined voltage $E_b$, equal to $kE_a$, is applied to the heater of $TH_b$ in circuit branch B. The respective DC outputs of the two thermocouples are arranged differentially so that $e_a$ and $e_b$ buck each other; accordingly, at the matched operating point with $e_a = e_b$ there is no residual voltage signal for application as an input to the servo amplifier $K_4$. From the explanation given previously, with respect to the operation of the servo amplifier $K_2$ in the modified embodiment of FIG. 1*a*, it will be evident that, in the circuit of FIG. 2, the servo amplifier $K_4$ performs in similar fashion to adjust the amplitude level of the output source $e_2$ so that the rms composite signal of $e_2$ and $ke_3$ applied across $TH_b$ maintains the output $e_b$ of that thermocouple in balance with the output $e_a$ produced by thermocouple $TH_a$. However, the operation of the input branch of this circuit embodiment is materially different from that of the preceding embodiment and requires a more detailed explanation.

In order for the circuit of FIG. 2 to effect the required rms conversion of the input signal $e_1$ to the output signal $e_2$, it is a necessary condition on the circuit's operation that the DC output $e_a$ of thermocouple $TH_a$ be maintained constant at the matched operating point. For this purpose a feedback control loop, formed of a source of reference DC potential $E_s$ and another servo amplifier $K_3$, is provided to operate on the input branch of the circuit. The polarity of the battery $E_s$ is arranged so that it bucks or opposes the DC voltage $e_a$ generated across the output terminals of the thermocouple $TH_a$. The resulting difference voltage is then applied as a polarized error signal input to the servo amplifier $K_3$ controlling the amplitude of the third signal voltage source $e_3$.

In the foregoing manner the servo loop of $K_3$ will operate to maintain $e_3$ at the value required so that its rms-addition to the input voltage $e_1$ produces a thermocouple output voltage $e_a$ in the A branch which is constant and equal to the reference potential source $E_s$. Concurrently, as previously described, the other servo loop in the output circuit will automatically adjust the amplitude of $e_2$ so that the output $e_b$ of the B branch thermocouple $TH_b$ will also remain constant and equal to the A branch output $e_a$. Accordingly, the necessary conditions will exist so that Equations (3), (4), and (5), as modified by the inclusion of the proportional factor $k$, are satisfied and the amplitude of the output signal $e_2$ will be exactly equal to the factor $k$ times the input signal $e_1$, as follows:

$$E_A=\sqrt{e_1^2+e_3^2}=\frac{E_B}{k}=\frac{1}{k}\sqrt{e_2^2+k^2\cdot e_3^2} \qquad (3a)$$

whereupon (after squaring both sides), $$e_1^2+e_3^2=(e_2^2/K^2)+e_3^2 \qquad (4a)$$

and therefore $$k^2\cdot e_1^2=e_2^2, \qquad (5a)$$

meaning that the rms value of the output signal $e_2$ is precisely $k$ times the rms value of the input signal $e_1$.

In addition to effecting precision rms conversion between input and output signals, it is also possible to employ the circuit embodiment of FIG. 2 when the various signal sources $e_1$, $e_2$ and $e_3$ are all coherent with each other so that the composite voltages $E_A$ and $E_B$, which are applied to the thermocouples $TH_a$ and $TH_b$ in the respective A and B branches of the comparator network, are formed by the *linear* rather than the rms summation of the signal sources. Thus, for example, if it be assumed that the input signal source $e_1$, the output signal source $e_2$, and the third signal source $e_3$ are all alternating sources of the same frequency and phases, then the composite voltage $E_A$ applied across the heater winding $TH_a$ will be the linear summation of $e_1$ and $e_3$, and correspondingly, the composite voltage $E_B$ across $TH_b$ will be the linear summation of $e_2$ and $k,e_3$. Thus, as before:

$$E_A=e_1+e_3=(1/k)\,(E_B)=(1/k)\,(e_2+k\cdot e_3) \qquad (3b)$$

whereupon $$e_1+e_3=(e_2/k)+e_3 \qquad (4b)$$

and therefore $$k\cdot e_1=e_2, \qquad (5b)$$

which indicates that the output voltage will remain at a fixed proportion of the input voltage level, irrespective of variations in signal amplitude. Such a circuit operation has an important advantage over the conventional voltage divider network formed of resistors because, as will be observed from the diagram of FIG. 2, the input and output voltage levels are electrically isolated from each other. Due to this de-coupling the signal source on one side of the circuit does not load the other, so that their respective current requirements can differ and vary without any carryover between the input and output sources.

Figure 3:
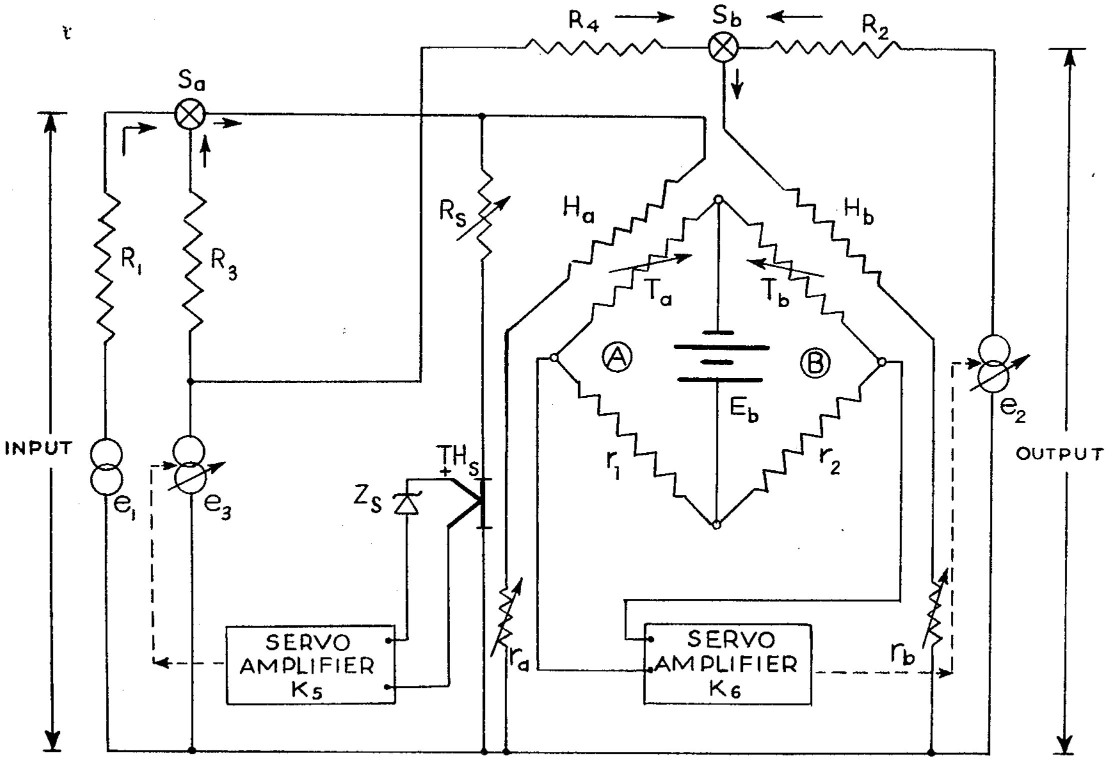
FIG. 3 is a schematic diagram of an additional alternative embodiment employing a single bridge arrangement formed of indirectly heated thermistor elements.

FIG. 3 is an additional alternative embodiment of a circuit for effecting rms signal conversion according to the present invention which employs a single bridge arrangement formed of indirectly heated thermistor elements. One important advantage of this particular arrangement is that the use of indirectly heated power-sensitive elements avoids any problem due to undesired mixing or cross-talk between input and output signals.

In this modification of the invention the comparison network comprises a bridge arrangement of two branches A and B, each branch having a respective thermistor arm Ta, Tb (with corresponding heater windings $H_a$, $H_b$) and an associated resistor arm $r_1$, $r_2$. A battery source $E_b$ is connected across the bridge so as to energize the two branches, and the output of the comparison network is derived across the respective mid-point terminals of the two branches A and B as in the conventional Wheatstone bridge arrangement.

The input, output and third signal sources ($e_1$, $e_2$ and $e_3$ respectively) are, for the sake of variety in this embodiment, connected in a parallel circuit configuration, rather than in a series configuration as shown in the previous embodiments. In this parallel configuration four summing resistors $R_1$, $R_2$, $R_3$ and $R_4$ are employed so that the current signals supplied to the respective heaters $H_a$ and $H_b$ of the thermistors $T_a$ and $T_b$ are combined in the desired manner for circuit operation. For proper signal summation to occur at the two summing points, $S_a$ for branch A and $S_b$ for branch B, it will be evident that the summing resistors must satisfy the following relationships:

$$R_1/R_3=R_2/R_4, \qquad (6)$$

where $R_1$ is the summing resistor for the input source $e_1$, $R_2$ is the summing resistor for the output source $e_2$, and $R_3$ and $R_4$ are the summing resistors for the third signal source $e_3$. (From the standpoint of simplicity, or for other considerations, it may be desirable to have all four summing resistors with the same resistance value, but this is not a necessary requirement.)

As will be observed from the schematic diagram of FIG. 3, currents representative of the voltage levels $e_1$ and $e_3$ are combined at the summing point $S_a$ and flow through the heater winding $H_a$ of thermistor $T_a$; correspondingly, the summing point $S_b$ combines currents representative of the voltage levels of $e_2$ and $e_3$ which then flow through the heater winding $H_b$ of thermistor $T_b$. Thus, the resistance of the thermistor $T_a$ in the A branch of the bridge varies in accordance with the rms summation of $e_1$ and $e_3$, and the resistance of the thermistor arm $I_b$ of the B branch varies in accordance with the rms summation of $e_2$ and $e_3$. Trimming resistors $r_a$ and $r_b$ are provided in the heater circuits of the respective thermistors $T_a$ and $T_b$ for adjusting the comparator bridge network for a match at a predetermined operating point, namely the battery voltage $E_b$, including compensation for differences in the respective thermistor characteristics and for the loading effect of the branch monitoring the voltage across the heater winding $H_a$.

In a manner similar to that described in connection with the embodiment of FIG. 2, two servo loops are provided for automatically adjusting the voltage levels of the sources $e_2$ and $e_3$ to maintain the comparison bridge in balance and at a constant operating point. The first loop, comprised of a thermocouple sensor $TH_s$, a reference zener diode $Z_s$ and servo amplifier $K_5$, monitors the voltage applied across the heater winding $H_a$ of thermistor $T_a$ and acts to maintain it at a constant level through adjustment of $e_3$. In this feedback circuit $R_s$ is a trimmer resistor which serves to adjust the DC output of the thermocouple $TH_s$ so that, at a predetermined value of the voltage applied across $H_a$ (corresponding to the level $E$ in the previous embodiments), the thermocouple output will be just slightly greater than the back-bias threshold voltage of the zener $Z_s$, thereby providing a small current input signal to the servo amplifier $K_5$. If the input voltage source $e_1$ should change to a new value, then the output of the sensor $TH_s$ would reflect this change and, by comparison with the reference potential level established by the zener $Z_s$, would result in a corresponding change in the error signal input to the amplifier $K_5$ which in turn would then adjust the level of $e_3$ to counteract the change in the composite voltage applied across $H_a$.

The second feedback loop, comprised of servo amplifier $K_6$, monitors the output of the comparison bridge formed of the branches A and B, and adjusts the level of the output voltage $e_2$ to maintain the bridge in balance. From what has been explained before with respect to the previous embodiments it will thus be seen that the operation of the circuit of FIG. 3 is such that, irrespective of variations in the level of the input signal $e_1$, the bridge is always maintained in balance and at the same fixed operating point through the automatic adjustment of the voltage sources $e_2$ and $e_3$. Consequently, the conditions set forth by Equations (4) and (5) are again satisfied, and the desired rms conversion between the input and output signals is effected.

It will be understood by those skilled in the art that the other circuit embodiments shown may be readily modified, in a manner similar to that depicted in the embodiment of FIG. 2, to include attenuator or multiplier means so as to introduce a constant proportional factor $k$ in the conversion effected between the input and output signals.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. A precision converter of electrical signals comprising:
   a. means for receiving a first signal source ($e_1$) as an input to said converter,
   b. a second signal source ($e_2$) of adjustable amplitude,
   c. a third signal source ($e_3$) of adjustable amplitude,
   d. a comparison bridge network formed of first and second current branches, each of which is responsive to an electrical signal applied thereto, said bridge network being adjusted to a balance condition for respective predetermined levels of electrical signals applied to said first and second bridge branches, said second predetermined level bearing a known numerical relationship to said first predetermined level,
   e. first circuit means for coupling said first and third signal sources, but not said second signal source, as a composite input to the first of said bridge branches,
   f. second circuit means for coupling said second signal source and said third signal source, but not said first signal source, as a composite input to the second of said bridge branches, and
   g. means for adjusting the respective amplitudes of said second and third signal sources so that, when said bridge network is restored to the balance condition, said balance condition for said network being invariant at the same operating level ($E$) irrespective of changes in the amplitude of said input signal $e_1$, the value of said second signal source $e_2$ is directly proportional to the value of said first signal source $e_1$.

2. The apparatus set forth in claim 1 wherein said known relationship between said first and second predetermined levels for balance of said respective bridge branches is unity, so that at the balance condition the second signal source $e_2$ is the equivalent of the first signal source $e_1$.

3 A precision rms converter of electrical signals comprising:
   a. means for receiving a first signal source ($e_1$) as an input to said converter,
   b. a second signal source ($e_2$) of adjustable amplitude having a waveform different from said first signal, the amplitude of said second signal being adjustable,
   c. a third signal source ($e_3$) of adjustable amplitude and having a waveform which is noncoherent in time with both of said first and second signals,
   d. a comparison bridge network formed of first and second current branches, each branch having a power-sensitive element therein which is responsive to the rms value of an electrical signal supplied thereto,
   e. means for adjusting said bridge network to a balance condition for respective predetermined levels of voltage applied across said first and second bridge branches, said second predetermined level bearing a known numerical relationship to said first predetermined level,
   f. first circuit means for coupling said first and third signal sources, but not said second signal source, as a composite input to the first of said bridge branches,
   g. second circuit means for coupling said second signal source and said third signal source, but not said first signal source, as a composite input to the second of said bridge branches, and
   h. means for adjusting the respective amplitudes of said second and third signal sources so that when said bridge network is restored to the balance condition, said balance condition for said network being invariant at the same operating level ($E$) irrespective of changes in the amplitude of said input signal $e_1$, the rms value of said second signal source $e_2$ is directly proportional to the rms value of said first signal source $e_1$.

4. The apparatus set forth in claim 3 whereby feedback control means are included in said converter for automatically adjusting the respective amplitudes of said second and third signal sources so as to maintain said bridge network at said balance condition.

5. The apparatus set forth in claim 4 wherein one of said first and second signal sources is a DC signal source and the other is an AC signal source.

6. A precision rms converter of electrical signals comprising
   a. means for receiving a first signal source ($e_1$) as an input to said converter,
   b. a second signal source ($e_2$) serving as an output of said converter and having a waveform different from said first signal, the amplitude of said second signal being adjustable,
   c. a third signal source ($e_3$) of adjustable amplitude and having a waveform which is noncoherent with both of said first and second signals,
   d. a comparison bridge network formed of first and second current branches, each branch having a power-sensitive element therein which is responsive to the rms value of an electrical signal supplied thereto,
   e. means for adjusting said bridge network to a balance condition for respective predetermined levels of voltage applied across said first and second bridge branches, said second predetermined level being a factor ($k$) times said first predetermined level,
   f. first circuit means for coupling said first and third signal sources, but not said second signal source, to the first of said bridge branches,
   g. second circuit means for coupling said second signal source and $k$ times said third signal source, but not said first signal source, to the second of said bridge branches, and
   h. feedback control means for automatically adjusting the respective amplitudes of said second and third signal sources so that said bridge network is maintained at said balance condition so as to satisfy the following relationship:

wherefore $k \cdot e_1$ (rms) = $e_2$ (rms), said feedback control means including a constant amplitude feedback oscillator, connected between said bridge network and said first circuit means, for generating said third signal ($e_3$) at the requisite amplitude level for maintaining at a constant value the rms composite of said first and third signals which are coupled by said first circuit means to said first bridge branch.

7. A precision rms converter of electrical signals comprising
   a. means for receiving a first signal source ($e_1$) as an input to said converter,
   b. a second signal source ($e_2$) serving as an output of said converter and having a waveform different from said first signal, the amplitude of said second signal being adjustable, c. a third signal source ($e_3$) of adjustable amplitude and having a waveform which is noncoherent in time with both of said first and second signals, d. a comparison network formed of a pair of Wheatstone bridges, each bridge being similarly comprised of $d_1$. two resistance branches, in at lease one branch of which is a thermistor or current-dependent resistance element and $d_2$. means for balancing each bridge so as to produce a null output when a predetermined level of potential is applied across its respective input terminals, e. first circuit means for coupling said first and third signal sources, but not said second signal source, as a composite input to the input terminals of one of said bridges, f. second circuit means for coupling said second and third signal sources, but not said first signal source, as a composite input to the other of said bridges, and g. means for adjusting the respective amplitudes of said second and third signal sources so that the following relationship is satisfied when both of said bridges are restored to the balance condition, said balance condition being invariant at the same operating point of said network irrespective of changes in the amplitude of said input signal:

$$\sqrt{e_1^2+e_3^2}=\sqrt{e_2^2+e_3^2},$$

wherefore $e_1$ (rms) $= e_2$ (rms).

8. A precision converter of electrical signals comprising a. means for receiving a first signal source ($e_1$) as an input to said converter, b. a second signal source ($e_2$) of adjustable amplitude serving as an output of said converter, c. a third signal source ($e_3$) of adjustable amplitude and having a waveform which is noncoherent with both of said first and second signals, d. a comparison network formed of first and second circuit branches, each branch containing the heater winding of a thermocouple element, and the respective DC outputs ($e_a$, $e_b$) of said thermocouples being arranged in opposing-polarity relation so as to produce an output signal for said network ($e_a$–$e_b$) which represents the difference in magnitude in the associated currents flowing in the respective circuit branches of said network, e. trimmer means for adjusting said comparison network for a null output when a first predetermined voltage level ($E_A$) is applied to said first circuit branch and a second predetermined voltage level ($E_B$), equal to a factor ($k$) times $E_A$, is applied to said second circuit branch, f. first circuit means for coupling said first and third signal sources together to produce current flow in said first circuit branch, g. second circuit means for coupling said second signal source and $k$ times said third signal source together to produce current flow in said second circuit branch, and h. means for adjusting the respective amplitudes of said second and third signal sources so that the following relationship is satisfied when said network output signal ($e_a - e_b$) is nulled, said null point being invariant for said network irrespective of changes in the amplitude of said input signal:

$$\sqrt{k^2 \cdot e_1^2+e_3^2}=\sqrt{e_2^2+e_3^2}$$

wherefore $k \cdot e_1$ (rms) $= e_2$ (rms).

9. The apparatus set forth in claim 8 wherein the factor $k$ equals unity so that at a null output of said network $e_1$ (rms) $=$ $e_2$ (rms).

10. The apparatus set forth in claim 8 further including feedback control means for automatically adjusting the amplitude level of said third signal source ($e_3$) so as to maintain constant the DC output ($e_a$) of the thermocouple of said first network circuit branch irrespective of variations in the amplitude level of said first signal source ($e_1$).

11. A precision converter of electrical signals comprising a. means for receiving a first signal source ($e_1$) as an input to said converter, b. a second signal source ($e_2$) of adjustable amplitude serving as an output of said converter, c. a third signal source ($e_3$) of adjustable amplitude and having a waveform which is noncoherent with both of said first and second signals, d. a comparison network formed of first and second circuit branches, each branch containing the heater winding of a thermocouple element, and the respective DC outputs ($e_a$, $e_b$) of said thermocouples being arranged in opposing-polarity relation so as to produce an output signal for said network ($e_a - e_b$) which represents the difference in magnitude in the associated currents flowing in the respective circuit branches of said network.

e. trimmer means for adjusting said comparison network for a null output when a first predetermined voltage level ($E_A$) is applied to said first circuit branch and a second predetermined voltage level ($E_B$), equal to a factor ($k$) times $E_A$, is applied to said second circuit branch, f. first circuit means for coupling said first and third signal sources together to produce current flow in said first circuit branch, g. second circuit means for coupling said second signal source and $k$ times said third signal source together to produce current flow in said second circuit branch, and h. means for adjusting the respective amplitudes of said second and third signal sources so that the following relationship is satisfied when said network output signal ($e_a - e_b$) is nulled:

wherefore $k \cdot e_1$ (rms) $= e_2$ (rms), said means including feedback control means comprised of a potential reference ($E_s$) arranged in opposing-polarity relation to the thermocouple DC output ($e_a$) of said first network circuit branch, and a servo amplifier having an input in the form of an error signal representing the difference of $e_a$ and $E_s$ and an output which is coupled so as to control accordingly the amplitude level of said third signal source ($e_3$), said feedback control means serving to automatically adjust the amplitude level of said third signal source ($e_3$) so as to maintain constant the DC output ($e_a$) of the thermocouple of said first network circuit branch irrespective of variations in the amplitude level of said first signal source ($e_1$).

12. The apparatus set forth in claim 10 further so a second feedback control means for automatically adjusting the amplitude level of said second signal source ($e_2$) 30 as to maintain said network output signal ($e_a - e_b$) at null.

13. A precision rms converter of electrical signals comprising a. means for receiving a first signal source ($e_1$) as an input to said converter, b. a second signal source ($e_2$) serving as an output of said converter and having a waveform different from said first signal, the amplitude of said second signal being adjustable, c. a third signal source ($e_3$) of adjustable amplitude and having a waveform which is noncoherent in time with both of said first and second signals, d. a comparison network in the form of a Wheatstone bridge comprised of two branches with an indirectly-heated thermistor element in each of said branches, a source of constant potential ($E_b$) connected to the input terminals for energizing said bridge, and selected resistance means in said branches for balancing said bridge so as to produce a null across its output terminals, e. first circuit means for coupling said first and third signal sources together so as to produce a current flow in the associated heater for a first one of said bridge thermistors, f. second circuit means for coupling said second and third signal sources together so as to produce a current flow in the associated heater of the second of said bridge thermistors, and g. means for adjusting the respective amplitudes of said second and third signal sources so that when said bridge is balanced for a null output, said null point being invariant for said network irrespective of changes in the amplitude of said input signal, the respective currents flowing in said thermocouple heaters are equal, whereby $e_1$ (rms) = $e_2$ (rms).

14. A precision rms converter of electrical signals comprising a. means for receiving a first signal source ($e_1$) as an input to said converter, b. a second signal source ($e_2$) serving as an output of said converter and having a waveform different from said first signal, the amplitude of said second signal being adjustable, c. a third signal source ($e_3$) of adjustable amplitude and having a waveform which is noncoherent with both of said first and second signals, d. a comparison network in the form of a Wheatstone bridge comprised of two branches with an indirectly-heated thermistor element in each of said branches, a source of constant potential ($E_b$) connected to the input terminals for energizing said bridge, and selected resistance means in said branches for balancing said bridge so as to produce a null across its output terminals, e. first summing resistor means for coupling together in parallel currents supplied respectively from said first and third signal sources so as to produce a current flow in the associated heater for a first one of said bridge thermistors, f. second summing resistor means for coupling together in parallel currents supplied respectively from said second and third signal sources so as to produce a current flow in the associated heater of the second of said bridge thermistors, and g. means for adjusting the respective amplitudes of said second and third signal sources so that when said bridge is balanced for a null output the respective currents flowing in said thermocouple heaters are equal, whereby $e_1$ (rms) $= e_2$ (rms).

15. The apparatus set forth in claim 13 further including feedback control means for automatically adjusting the amplitude level of said third signal source ($e_3$) so as to maintain constant the current flowing in the heater associated with said first bridge thermistor, irrespective of variations in the amplitude level of said first signal source ($e_l$).

16. A precision rms converter of electrical signals comprising a. means for receiving a first signal source ($e_1$) as an input to said converter, b. a second signal source ($e_2$) serving as an output of said converter and having a waveform different from said first signal, the amplitude of said second signal being adjustable, c. a third signal source ($e_3$) of adjustable amplitude and having a waveform which is noncoherent with both of said first and second signals, d. a comparison network in the form of a Wheatstone bridge comprised of two branches with an indirectly-heated thermistor element in each of said branches, a source of constant potential ($E_b$) connected to the input terminals for energizing said bridge, and selected resistance means in said branches for balancing said bridge so as to produce a null across its output terminals.

e. first circuit means for coupling said first and third signal sources together so as to produce a current flow in the associated heater for a first one of said bridge thermistors, f. second circuit means for coupling said second and third signal sources together so as to produce a current flow in the associated heater of the second of said bridge thermistors, and g. means for adjusting the respective amplitudes of said second and third signal sources so that when said bridge is balanced for a null output the respective currents flowing in said thermocouple heaters are equal, whereby $e_1$ (rms) $= e_2$ (rms); said means including feedback control means comprised of a thermocouple whose heater winding is coupled across the heater associated with said first bridge thermistor so as to generate a d-c output which is representative of the voltage drop across said heater, a potential reference arranged in opposing-polarity relation to the output of said thermocouple, and a servo amplifier having an input in the form of an error signal representing the potential difference between said thermocouple and said reference and an output which is coupled so as to control the amplitude level of said third signal source ($e_3$), whereby said feedback control means serves to maintain constant the current flowing in the heater associated with said first bridge thermistor, irrespective of variations in the amplitude level of said first signal source ($e_1$).

17. An isolation amplifier comprising:

a. means for receiving a first signal source as an input to said amplifier, b. a second signal source of adjustable amplitude and of time coherent waveform with said first signal, serving as an output of said converter, c. a third signal source of adjustable amplitude and also of time coherent waveform with said first signal, d. a comparison bridge network formed of first and second current branches, each of which is responsive to an electrical signal applied thereto, said bridge network being adjusted to a balance condition for respective predetermined levels of electrical signals applied to said first and second bridge branches, said second predetermined level bearing a known numerical relationship to said first predetermined level, e. first circuit means for applying the linear summation of said first and third signal sources as an input to the first of said bridge branches, f. second circuit means for applying the linear summation of said second and said third signal sources as an input to the second of said bridge branches, and g. means for adjusting the respective amplitudes of said second and third signal sources so that, when said bridge network is restored to the balance condition, said balance condition for said network being invariant at the same operating level irrespective of changes in the amplitude of said input first signal source, the second signal source is directly proportional to said first signal source.

* * * * *